Aug. 24, 1965

J. C. BEYNON 3,202,538

MAGNETIC RECORDING DEVICE AND METHOD FOR PRODUCING SAME BY ELECTROLESS PLATING

Filed June 4, 1963

JOHN C. BEYNON
INVENTOR.

BY George C. Thompson, agent

Morris Spector,
ATTORNEY

United States Patent Office 3,202,538

Patented Aug. 24, 1965

3,202,538

MAGNETIC RECORDING DEVICE AND METHOD FOR PRODUCING SAME BY ELECTROLESS PLATING

John C. Beynon, North Hollywood, Calif., assignor, by mesne assignments, to The Bunker-Ramo Corporation, Stamford, Conn., a corporation of Delaware Filed June 4, 1963, Ser. No. 285,853
17 Claims. (Cl. 117—119.2)

This invention relates to a magnetic recording device and more particularly to a high coercive force recording medium which adheres strongly to a base support material while maintaining high magnetic quality. This application is a continuation-in-part of copending application Serial No. 837,611 filed September 2, 1959 now abandoned.

Magnetic drums previously produced have generally been of ferrous oxide or nickel cobalt types. Both types of recording drums are usually produced by procedures which involve many painstaking steps. For example, in the production of the ferrous oxide type drum, it is usually necessary to grind the base material drum, spray the drum with a plastic base, bake the plastic onto the drum, grind the plastic to a thickness of approximately .003 inch, spray on a ferrous oxide coating, bake the ferrous oxide coating and then grind it to the desired thickness, which may be as small as .0002 inch or as large as .001 inch.

In producing a drum of this nature, several inaccuracies occur which cannot be eliminated. The first results from successive grinding operations, such as the grinding of the plastic base to obtain the .003 inch thickness, following the grinding of the base member. The center used in the plastic base grinding operation can easily vary from the center used in the grinding of the base material to form the drum shape. This results in a variation in the depth of the ground plastic coating from point to point. The grinding operation of the ferrous oxide coating may also utilize a center different from either that of the base drum or that of the plastic base. Even when each grinding operation is performed on the same center, the thickness of the coating can still vary by plus or minus .0001 inch. It is obvious, therefore, that the thickness of the ferrous oxide coating can vary as much as 50 percent, resulting in a substantial variation in the recording ability.

A typical conventional nickel-cobalt drum is produced in the following manner. The base drum is ground to a size which allows for the additional coatings to be placed thereon. The drum is then electroplated with silver or nickel to provide a satisfactory surface to which the nickel cobalt can adhere. Since electroplating results in an uneven coating, particularly along the corners or edges of the drum, it is necessary to grind the silver or nickel base to provide requisite surface uniformity. The drum with its silver or nickel base is then electroplated with nickel-cobalt. The thickness of the nickel-cobalt layer is usually limited to about .0003 inch because thicker coatings adhere very poorly to the underlying surface. The nickel-cobalt may then be polished to provide a smooth surface. A drum manufactured by this method is limited by the adhesion of the nickel-cobalt to the silver or nickel base, which adhesion is in any event generally weak. In addition, it is difficult to control the coercivity and uniformity of such a coating during formation thereof.

It is, therefore, an object of this invention to provide a magnetic recording medium.

It is also an object of this invention to provide an improved magnetic recording medium in a relatively simple manner.

It is another object of this invention to provide a magnetic drum coating having high coercivity, substantially uniform thickness and good adhesion to the base member of the drum.

It is another object of this invention to provide a magnetic recording medium capable of being applied as a relatively thick magnetic coating due to the improved adhesion of the coating.

It is another object of this invention to provide a magnetic recording device comprising a base member and a magnetic coating in which only the base member must be ground, thus eliminating errors commonly encountered during successive grinding operations.

It is still another object of this invention to produce a magnetic recording device having a magnetic coating with a uniform thickness tolerance of plus or minus .000025 inch.

It is another object of this invention to provide a magnetic recording medium having substantially uniform magnetic properties, including high coercivity.

It is another object of this invention to provide normally nonmagnetic coatings, which include nickel and phosphorus, with magnetic qualities so as to obtain a high quality, uniform magnetic medium well suited to magnetic recording.

It is another object of this invention to provide a magnetic recording medium capable of long life.

It is another object of this invention to provide a magnetic recording medium having high coercivity and low noise properties, particularly for recordings employing direct current erase and biasing.

Other objects, purposes and characteristic features will become obvious as the description of the invention progresses.

In practicing one embodiment of this invention, a recording medium such as a drum of nonmagnetic material is provided with a chemically deposited phosphorus and nickel-containing coating which may also include other constituents, which coating is normally at least essentially nonmagnetic. The coating on the drum is in the amorphous state, but is then heated to a transformation temperature to substantially convert the same to a microcrystalline condition and to impart magnetic properties thereto, after which it is slowly cooled at a rate whereby it retains its accurate dimensions, good adhesion and sufficiently high magnetic coercivity to render it useful as a magnetic recording medium, e.g., above about 200 oersteds.

In the drawing.

In each of the several views similar parts bear like reference characters.

Figure 1:
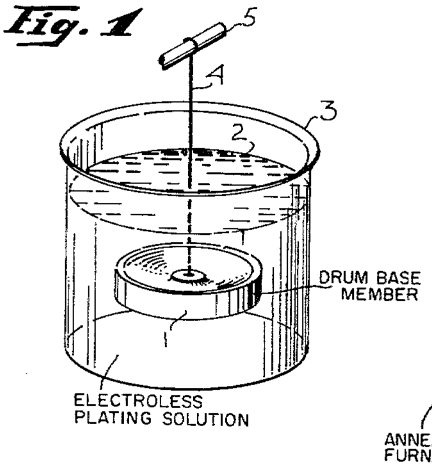
FIGURE 1 is a view illustrating the chemical deposition of a phosphorus and nickel-containing coating on a drum base member.
Figure 2:
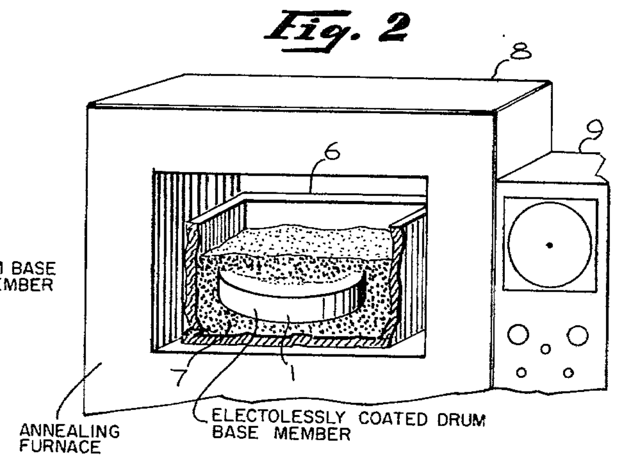
FIG. 2 is a view illustrating the heat treatment of the coated drum.

A magnetic recording medium is produced which has high uniform coercivity throughout its surface area, that is, a uniform coercivity of at least about 200 oersteds and preferably up to 300 oersteds or more, a high retentivity and a hardness preferably in excess of 900 (Vickers number. Moreover, the medium has a permanent adhesion to an essentially nonmagnetic base member. A suitable previously machined base member shown in the form of a drum 1 can, for example, be immersed in a chemical solution 2 containing phosphorus and nickel, as well as other alloying elements, within a container 3, as illustrated in FIG. 1. The base member 1 is generally formed of nonmagnetic material, such as stainless steel, brass or aluminum but may be of other materials, for example glass.

The solution 2 is any suitable electroless plating or chemical reduction solution which uniformly deposits an amorphous coating which includes nickel and phosphorus in a particular range of ratios and which may also include other alloying materials which do not interfere with the production of a finished microcrystalline coating having a high coercivity. Thus, for example, chromium salts, vanadium salts and the like may be present in minor concentrations to provide coatings containing chromium and/or vanadium and the like, in addition to nickel and phosphorus. A typical electroless plating solution can be used which provides a nickel phosphide coating having the constituents as set forth in Table I:

TABLE I

| Constituents: | Percentage by weight |
|---|---|
| Nickel | [1] 90–92 |
| Phosphorus | [1] 8–10 |
| Carbon | 0.0400 |
| Oxygen | 0.0023 |
| Nitrogen | 0.0047 |
| Hydrogen | 0.0016 |

[1] Ratio of Ni:P approximately 10:1.

It should be noted that, in accordance with the invention, the coating as deposited on the base member is essentially nonmagnetic. It has been found that nickel-containing amorphous coatings which include 8 to 10 percent phosphorus are essentially nonmagnetic, but such coatings can be rendered highly magnetic. The phosphorus content can be increased to a higher percentage, for example 11 percent, for greater ultimate magnetic qualities, up to a limit of phosphorus beyond which either a brittle coating is formed on the base member 1 or chemical deposition ceases. At about 11 percent phosphorus, the coating as deposited is wholly nonmagnetic. In any event, the phosphorus content should, however, be at least about 8 percent, by weight of the coating, and preferably about 10 percent, by weight, of said nickel in the coating. Other chemically deposited coatings containing the approximate 10:1 nickel:phosphorus ratio can also be produced. For example, a coating can be electrolessly deposited which contains the constituents of Table I in about the same proportions as set forth in Table I, except for the addition of about 1 percent by weight of chromium or vanadium, with a corresponding decrease in the concentration of nickel.

It has been found that, for most purposes, iron is not an acceptable alloying element with the nickel and phosphorus, since the resulting alloy tends to have a low coercivity, i.e. well below 100 oersteds, even when converted to microcrystalline form in accordance with the present method. Molybdenum also is usually not suitable for addition to the nickel-phosphorus-containing coating. Selection of suitable alloying elements, however, can be made on the basis of their effect on the coercivity of the finished coating. Those alloying elements which result in coatings which exhibit, after conversion to the microcrystalline state, coercivities well below 200 oersteds are generally unsuitable for present purposes.

The base member or drum 1 is supported by some suitable means such as the support member 4 secured to a support frame 5. The drum is suspended within solution 2 and is spaced from the walls and bottom of the container 3. During preparation of the drum for receiving the chemical deposit, care should be taken to avoid using lubricants or cutting oils containing sulfur. In addition, the introduction of any foreign matter containing sulfur during the chemical plating process of the drum 1 should be avoided. Small amounts of sulfur introduced during chemical deposition can prevent the drum from obtaining the proper magnetic qualities necessary for a good recording medium and in some cases can prevent the drum from obtaining even small magnetic properties. It is also desirable to heat cycle the drum 1 prior to grinding and coating to reduce any warpage that may occur due to the heat treatment. This preliminary heat cycle should be at or above the temperature of the heat treatment.

After supporting the drum 1 in solution 2 for a time period necessary to provide a uniform coating of (for example) a thickness from 0.00005 to 0.005 of an inch, the drum is removed from the solution and placed within a container 6 which may be substantially filled with an inert refractory heat transfer medium, such as aluminum oxide 7, or magnesium oxide, in powder form. Such medium should be inert at temperatures of up to about 500° C., i.e., to above contemplated heat treating temperatures. The heat transfer medium completely surrounds the coated drum 1 and uniformly distributes heat thereto so as to cause the temperature of drum 1 to increase and decrease uniformly over the entire surface of the drum.

The container 6 is placed within an oven 8 controlled by suitable controls 9 to uniformly raise the temperature of the drum 1 to from about 200° C. to about 400° C., preferably about 350° C. This temperature is maintained preferably for a time period necessary to substantially completely convert the deposited phosphorus-nickel-containing coating from an amorphous to a microcrystalline state. At the preferred temperature of 350° C., the heat treating time is usually from about one to two hours, with longer times required at lower temperatures. Although approximately 90 percent of the coating changes to the microcrystalline state in the first few minutes after reaching a temperature of 350° C. to 400° C., the heat treating temperature is desirably maintained for a period of from one to two hours in order to obtain the greatest possible conversion of the coating to a microcrystalline form.

Other methods of heat treating which are satisfactory employ hydrogen or nitrogen as an inert atmosphere to minimize oxidation. A somewhat higher coercivity is obtained using nitrogen. If the furnace temperature control is sufficiently accurate the packing in refractory oxide may be dispensed with.

Figure 3:
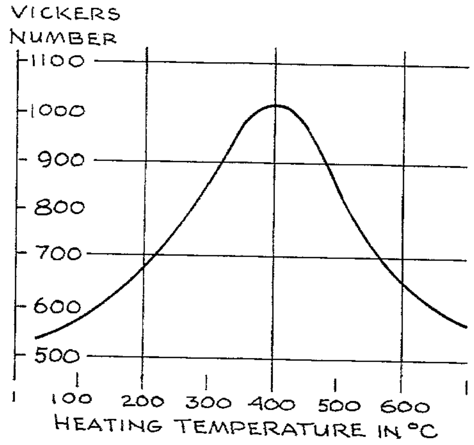
FIG. 3 is a curve illustrating the Vickers number hardness of a typical nickel-phosphorus coating as plotted against drum temperature.

The curve shown in FIG. 3 represents one typical hardness curve of an electrolessly deposited nickel phosphide coating. It can be seen that the maximum hardness for the coating is reached at a temperature at 400° C. The magnetic qualities of the coating substantially parallel the hardness, so that the maximum magnetic response and retentive qualities of the nickel phosphide coating can occur only if a temperature somewhere around 400° C. is used in the heat treatment process. As shown by the curve in FIG. 3, the hardness of the coating falls off rather rapidly if the 400° C. temperature is substantially exceeded. Accordingly, in the heat treatment of nickel phosphide-containing coatings, temperatures substantially in excess of 400° C. are to be avoided. It will be understood that if a minor proportion of another element, such as chromium, is present along with the nickel and phosphorus in the coating, the preferred temperature may vary to a small extent, but is readily determinable by measurement of the hardness of the coating for various treating temperatures. For most such coatings, heat treating temperatures in the range of about 350–400° C. generally are also preferred.

Figure 4:
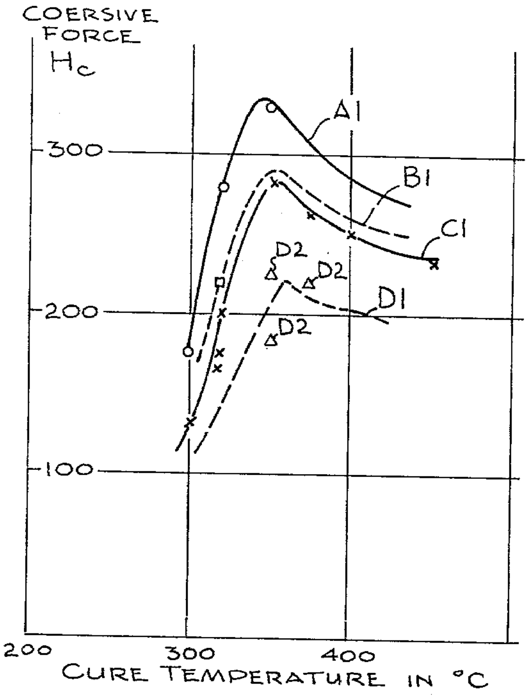
FIG. 4 is a curve of coercive force for the coating plotted against its curing temperature.

An indication of the magnetic qualities of a coating is set forth in the curve of FIG. 4 illustrating the change in coercive force in a nickel phosphide coating for different heat treating temperatures on different base metals, The curves A1, B1 and C1 show the results of the coatings on aluminum, stainless steel and brass, respectively, with each coating cooled to ambient temperature at a rate of 20° C. per hour.

Improved magnetic coatings can be provided for magnetic recording devices such as coated drums by the treatment of the coatings at lower temperatures (for example 300° C.), if the heat treating time or cure time is greatly extended (for example to 15 to 20 hours). However, such added treating time does not improve the coercive force over that indicated in FIG. 4.

It is an important part of the present invention to carefully control the rate of cooling of the heat treated coating so as to substantially preserve the high coercive force and good magnetic qualities imparted to the coating during the heat treating. If the cooling is rapid and/or if it is not uniform and controlled, most, if not all of the desired acquired magnetic properties of the originally essentially nonmagnetic coatings are lost. Prior processes which do not recognize the critical nature of such controlled cooling cannot uniformly and reproducibly provide magnetic coatings having the improved properties which render them so suitable for high density data processing recording purposes. The present method provides the required controlled heat treating and controlled cooling so that the finished coatings are of uniformly high magnetic quality and well adapted for high density data processing recording purposes. For example, after the described heat treating, the coated drum should be cooled at a carefully controlled slow rate, usually at not in excess of about 30° C. per hour, and preferably at no more than about 20° C. per hour.

If, after maintaining the drum 1 at the desired heat treating temperature level for a period of from one to two hours, the drum were then to be cooled at a rapid rate to room temperature, the drum would possess erratic and usually undesirable magnetic qualities. The magnetic qualities would tend to vary from point to point throughout the area of the coating, rather than being uniform. Moreover, during rapid cooling minute cracks often appear in the coating surface, which cracks cause coating deterioration and are the source of spurious or false signals as the cracks pass the magnetic playback head during use of the coating on a recording drum. A crack-free coating is highly desirable. Cooling must also be sufficiently slow so as to retain for the coating the high coercive force imparted thereto.

The specified desired cooling rate can be exceeded somewhat but only at a sacrifice in magnetic quality and uniformly in the finished coating. For example, if a nickel-phosphorus containing coating which had been heat treated at 400° C. for 2 hours were to be cooled in one hour from 400° C. to 200° C. and in 20 minutes from 200° C. to room temperature a drum of substantially poorer quality than a drum cooled at the prescribed slower rate, e.g. 20° C. per hour, would result. Moreover, of even more importance, if a plurality of coated drums were cooled at the indicated rapid rate, the drums would not be uniform in their magnetic qualities. Predictable and reliable magnetic quality is highly important in the commercial production and use of magnetic recording media. Accordingly, rapid cooling impairs the commercial utility of the products.

The effect on nonuniformity of magnetic quality due to rapid cooling is clearly shown in FIG. 4 by the curve D1. Thus, the points D2 are well scattered indicating the nonuniform results obtained with a plurality of rapidly cooled drums. Moreover, the curve D1 falls well below curves A1, B1 and C1 which indicates the general reduction of coercive force due to the fast cooling.

It will be understood that the nature of the base on which the coating is deposited will in part determine the heat treating temperature. Thus, it has been found that good quality coated drums can be obtained with an aluminum base at 320° C. heat treating temperature without warpage of the drum. Although higher heat treating temperatures improve the coercive force of the coating, they result in some warpage of the drum, so that 320° C. in this instance is preferred.

Phosphorus-nickel containing coatings properly heat treated and cooled in accordance with the present invention not only have high coercive force well in excess of 200 oersteds and usually 300 oersteds, but also have excellent magnetic retention qualities which are absolutely necessary for magnetic drums. So far as is known, such magnetic retention qualities are not uniformly obtained by heat treating and cooling of the described coatings under conditions other than those set forth herein.

The described heating and cooling steps are highly important because the phosphorus-nickel-containing coatings having the appropriate nickel:phosphorus ratios set forth above are basically nonmagnetic as deposited and such coatings remain nonmagnetic unless subjected to the described heat treatment and cooling.

The drum or other base member is constructed of structurally strong material, which may be a nonmagnetic metal such as stainless steel, brass or aluminum, or it may be another nonmagnetic material such as glass, plastic and the like. The potentially magnetic coating deposited thereon has sufficient adhesion thereto, even on drums of glass and the like, to form an integral part thereof, so that the finished magnetic recording device has high durability. Chemical deposition of the coating on the drum assures that the coating is substantially uniformly distributed over the entire immersed surface thereof, regardless of the shape of the drum or other base member.

The base member can be fabricated of, for example, stainless steel, and can be first heat treated and machined prior to the chemical deposition of the potentially magnetic coating on the surface thereof. Since the coating uniformly deposits itself over the entire surface of the base member, further machining is not necessary, the base member retaining dimensional tolerances during such deposition, and subsequent heat treating and cooling. Some polishing of the deposited coating may be desirable, in at least some instances, although polishing is not necessary. The following examples further illustrate certain features of the present invention.

*Example I*

A stainless steel drum to be used as a magnetic recording device is heat treated at 400° C. for 2 hours, then cooled and machined to provide a smooth, uniformly curved surface. The heat treating of the drum prevents dimensional distortion of the drum upon subsequent heat treatment after deposition of a potentially magnetic coating on the surface thereof.

The drum is immersed in an electroless, plating solution having the constituents set forth in Table II below:

TABLE II

| Constituents: | Parts by weight |
|---|---|
| Nickelous chloride ($NiCl_2.6H_2O$) | 3 |
| Sodium hypophosphite ($NaH_2PO_2.H_2O$) | 1 |
| Ammonium chloride ($NH_4Cl$) | 5 |
| Sodium citrate ($Na_3C_6H_5O_7.2H_2O$) | 10 |
| Water ($H_2O$) | 81 |
| Ammonium hydroxide ($NH_4OH$), sufficient to adjust pH to and to maintain pH at 8–9. | |
| Temperature of bath above 194° F. | |

The drum is totally immersed in and suspended within the indicated electroless plating solution and is spaced from the bottom and walls of the container holding the solution. The drum is maintained in the solution until a uniform coating of about .0005 inch in thickness is deposited over the entire exposed surface thereof. Since the rate of deposition is about .00025 inch per hour, the drum is maintained in the solution for about two hours. Thereupon, the drum is withdrawn from the electroless plating solution, dried and packed in powdered alumina in a container. The coating as deposited on the drum has a nickel:phosphorous ratio of about 10:1 and is essentially nonmagnetic. The packed drum is then placed in an oven and uniformly and slowly heated to 350° C. The drum is maintained at 350° C. for two hours, and is then cooled at a rate not exceeding 20° C. per hour to ambient temperature.

The drum is then removed from the packing in the container, freed of all particles of alumina adhering to the surface thereof and is tested for hardness, coercivity and retentivity as an improved magnetic recording device. It is found that the hardness of the coating deposited in a thickness of .0005 inch uniformly over the surface of the drum is about 1000 in Vickers numbers. The coercive force of the finished coating is about 325 oersteds. the coating exhibits high retentivity and is highly suitable During use as an improved magnetic recording medium, the coating exhibits high retentivity and is highly suitable for magnetic recording in a high density data processing system. The coating is permanently bonded to the drum surface and is smooth, uniform and crack-free. Such coating is capable of use at high speeds. Metallurgical analysis of the coating demonstrates that the coating comprises a microcrystalline structure which consists essentially of nickel and phosphorus with a ratio of nickel: phosphorus of about 10:1.

*Example II*

Treatment is carried out on a recording drum substantially in accordance with the conditions set forth in Example I, with the following changes:

The treating solution includes, in addition to the constituents and proportions as set forth in Table II, chromium chloride ($CrCl_3.6H_2O$) in a concentration of about .05 part. This yields, after heat treatment, a finished microcrystallized phosphide coating containing approximately 1.5 percent chromium, substantially the remainder comprising nickel and phosphorus. The heat treating temperature for the drum itself prior to chemical deposition of the coating thereon is 450° C. Moreover, the coating, after deposition on the drum, is essentially nonmagnetic, having a nickel:phosphorus ratio of about 10:1. It is then heat treated on the drum in a packing of powdered magnesia at 400° C. for 1.5 hours to render it highly magnetic, after which the heat treated product is cooled at a rate of about 20° C. per hour to ambient temperature.

The resulting coating is permanently bonded to the drum surface, smooth, uniform and crack-free and is highly suitable for use as a magnetic recording medium in data processing system. The finished coating exhibits a coercivity of about 300, a Vickers hardness of about 1050 and high retentivity.

Parallel tests demonstrate that when molybdenum is substituted for chromium in the electroless solution, adequate chemical deposition of a suitable coating cannot be achieved. Moreover, when iron is substituted for the chromium, a product having a coercivity (after heat treatment at about 350° C. for two hours followed by cooling at a rate of 20° C. per hour to ambient temperature) not in excess of about 50 oersteds results, which product is clearly unsuitable for use in high density processing recording media. However, when vanadium is substituted for chromium in accordance with the preceding conditions, a finished coating having a high coercivity and hardness and wholly suitable for magnetic recording purposes is obtained.

The preceding examples clearly illustrate the improved results obtained in accordance with the present method. Thus, nonmagnetic or essentially nonmagnetic nickel and phosphorus-containing coatings are rendered highly magnetic so that they exhibit coercivities in excess of 200 oersteds and in most instances approaching or exceeding 300 oersteds. Moreover, such coatings have improved retentivity and a high hardness of the order of about 900 to 1100 Vickers numbers so that the coatings are durable. Moreover, the coatings are of uniform quality throughout and can be easily reproduced in quantity and at low cost to the same high standards. The magnetic coatings are permanently bonded to and integral with the base member or drum in the finished product so that delamination during use does not occur. Moreover, the surface of the magnetic coating is smooth, uniform and crack-free.

It will be understood that not only can chromium be used with nickel and phosphorus in the finished coating but so also can vanadium and other metals which do not depreciate the desired physical and magnetic properties of the coatings. Metals, such as iron, which do depreciate one or more of such qualities should not be used.

It will be further appreciated that various chemical depositing solutions, in addition to the particular electroless plating solutions set forth above, can be utilized in practicing this invention. It will also be understood that the heat treating and cooling steps carried out on the deposited coating in accordance with the present method are essential for uniformly improved results. The heat treatment changes the coating from an amorphous to a microcrystalline state and increases the hardness and retentivity thereof while maximizing the coercivity thereof. Thus, it converts the coating from an essentially nonmagnetic condition to a highly magnetic condition. Moreover, the slow cooling stabilizes the improved properties thus obtained, without substantial depreciation of such properties. The coating during and subsequent to the slow cooling remains uniform in its properties and remains continuous and crack-free.

Figure 5:
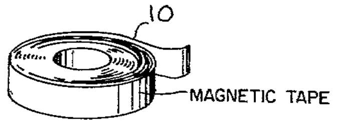
FIG. 5 is a view of a magnetic tape illustrating another structure utilizing the principle of this invention.

Although the foregoing description has been largely directed to magnetic recording media on drums, it will be obvious that a tape 10 formed of a suitable flexible base material may be used, as shown in FIG. 5, as the base member for the magnetic coating, particularly if the diameter of the reel upon which the tape is wound is sufficiently large to prevent cracking of the magnetic coating deposited on the tape. A tape of this nature is relatively indestructible.

Figures 6, 7:
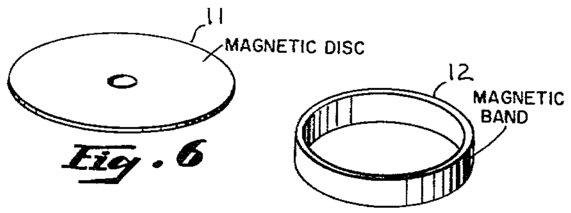
FIG. 6 is a view of a magnetic disc illustrating another structure utilizing the principles of this invention.
FIG. 7 is a view of a magnetic band illustrating another structure utilizing the principles of this invention.

In FIG. 7 there is shown a disk 11 of a suitable base material coated with the improved magnetic coating. The disk also is relatively indestructible.

The device of FIG. 7 illustrates a band 12 of a suitable material such as stainless steel carrying the improved magnetic coating on both surfaces thereof. The finished band can be secured over a suitable spider or hub by some means such as by pressing, so that both the internal and external surfaces thereof can be used for recording operations.

Drums or other magnetic recording devices can be coated with a magnetic nickel-phosphorus containing coating of 5 to 10 mils in thickness when it is desired to enhance the characteristics of the drum for recording low frequencies. Such coating is five to ten times as thick as magnetic coatings presently used. The response of this drum, therefore, is considerably better at the low frequency end of the spectrum. Conversely, the magnetic coating can be extremely thin so as to provide a magnetic recording medium capable of retaining short wavelength recordings without serious self-demagnetization. Because of the high electrical resistivity of the improved magnetic phosphorus and nickel-containing coatings, high frequency recordings made thereof are not seriously attenuated by eddy current losses.

While there have been described various embodiments of the invention, it will be obvious to those skilled in the art that various changes and modifications may be made therein without departing from the invention. Accordingly, all changes and modifications falling within the scope of the appended claims are to be considered to be a part of this invention.

The embodiments of the invention in which an exclusive property or privilege is claimed are defined as follows:

1. A process of producing on a base member a magnetic recording medium having high magnetic retentivity, a coercivity of at least about 200 oersteds and permanent adhesion to said base member, which process comprises the successive steps of:
chemically depositing a smooth amorphous, at least essentially nonmagnetic coating which includes nickel and about 8–11 percent by weight of phosphorus on the surface of a base member by electroless plating,
heating said coating to a selected temperature of about 200–400° C. for a time sufficient to substantially convert said coating to a microcrystalline structure, whereby the coercivity thereof is increased to at least about 200 oersteds and the hardness thereof and retentivity thereof are substantially increased so as to permit the use of said coating as a magnetic recording medium, and
then cooling said coating to ambient temperature at a rate not in excess of about 30° C. per hour and sufficiently slow as to prevent substantial deterioration of the magnetic properties produced therein, whereby an essentially smooth and crack-free magnetic recording medium is provided which is permanently bonded to said base member.

2. A process of producing on a base member a magnetic recording medium having high magnetic retentivity, a coercivity of at least 200 oersteds and permanent adhesion to said base member, which process comprises the successive steps of:
chemically depositing a smooth continuous amorphous coating comprising nicked and about 8–11 percent by weight of phosphorus on the surface of a nonmagnetic base member by electroless plating,
uniformly heating said coating to an annealing temperature of between about 200° C. and about 400° C. and maintaining said coating at said temperature for a time sufficient to substantially completely convert said coating to a microcrystalline state, thereby increasing the magnetic retentivity thereof and also increasing the coercivity thereof to at least 200 oersteds, said annealing also substantially increasing the hardness of said coating so that coating has utility as a magnetic recording medium, and
thereafter cooling said coating at a sufficiently slow rate not in excess of about 30° C. per hour so as to prevent substantial deterioration of the magnetic properties provided therein by said annealing, whereby an improved magnetic recording medium is provided which is permanently bonded to said base member and which is smooth, continuous and crack-free.

3. A process of producing on a magnetic base member a magnetic recording medium having high magnetic retentivity, a coercivity of at least 200 oersteds and good adhesion at high speeds, which process comprises the steps of:
chemically depositing a smooth, uniform, amorphous, essentially nonmagnetic coating comprising nickel and about 8–11 percent by weight of phosphorus on the surface of a nonmagnetic base member by electroless plating,
heating said coating to a temperature of between 300° C. and 400° C.,
maintaining said coating at said temperature for a time sufficient to substantially convert said coating to a microcrystalline state to substantially increase the hardness thereof, to increase the coercivity thereof to at least 200 oersteds, and to also substantially increase the magnetic retentivity thereof, and
thereafter slowly cooling said coating at a rate not in excess of about 20° C. per hour, so as to prevent deterioration of the magnetic properties provided in said coating by said heat treating, whereby an improved magnetic recording medium having substantially uniform magnetic properties is provided which is permanently bonded to said base member and which is smooth, continuous and crack-free.

4. The improved process of claim 3 wherein said coating is substantially completely converted to the microcrystalline state and wherein the annealing results in a coating hardness in excess of about 900 in Vickers numbers.

5. The process of claim 4 wherein an electroless plating solution is utilized to chemically deposit said coating on said base member, wherein said coating has a nickel-to-phosphorus ratio of about 10:1 and wherein said coating is heated uniformly to a temperature of about 350° C. and is maintained at said temperature for a period of time sufficient to increase the hardness of said coating to approximately 1000 in Vickers numbers, to increase the coercivity of said coating to substantially in excess of 300 oersteds and to substantially improve the magnetic retentivity thereof.

6. The process of claim 3 wherein said coating includes up to about 2 percent by weight of chromium.

7. The process of claim 4 wherein chromium is present in said coating in a concentration of between about 1 and about 2 percent, by weight, based upon said nickel and said phosphorus, and wherein the ratio of the nickel to phosphorus in said coating is about 10:1.

8. The process of claim 3 wherein said coating includes up to about 2 percent by weight of vanadium.

9. The process of claim 4 wherein vanadium is present in said coating in a concentration of between about 1 and 2 percent by weight, based upon said nickel and said phosphorus, and wherein the ratio of nickel to phosphorus in said coating is about 10:1.

10. A process for producing on a nonmagnetic member a magnetic recording medium having high magnetic retentivity and a coercive force of at least 200 oersteds and good adhesion at high speeds, comprising the successive steps of:
chemically depositing a coating of amorphous phosphorus nickel having an approximate nickel-phosphorus ratio of 10:1 on the member by electroless plating,
heating the coated member to a temperature of between 300° C. and 400° C., and
cooling the member at a sufficiently slow rate, not in excess of about 20° C. per hour, to prevent deterioration of the magnetic properties.

11. An improved magnetic recording device comprising:
a base member, and
a highly magnetic coating suitable for magnetic recording and comprising phosphorus in a concentration of about 8–11 percent by weight and nickel in a microcrystalline state disposed uniformly on and permanently bonded to the surface of said base member, said coating having a coercive force of at least about 200 oersteds and a high magnetic retentivity.

12. The improved magnetic recording device of claim 11 wherein said coating has a hardness in excess of about 900 in Vickers numbers, and a ratio of nickel to phosphorus of about 10:1.

13. The improved magnetic recording device of claim 12 wherein said coating is substantially completely in the microcrystalline state and has a coercivity in excess of about 300 oersteds and a hardness in excess of about 1000 in Vickers numbers.

14. The improved magnetic recording device of claim 12 wherein said coating includes up to about 2 percent by weight of chromium.

15. The improved magnetic recording device of claim 13 wherein chromium is present in said coating in a concentration between about 1 and about 2 percent by weight, based upon said nickel and said phosphorus.

16. The improved magnetic recording device of claim 12 wherein said coating includes up to about 2 percent by weight of vanadium.

17. The improved magnetic recording medium of claim 13 wherein vanadium is present in said coating in a concentration of between about 1 and about 2 percent by weight, based upon said nickel and said phosphorus.

References Cited by the Examiner

UNITED STATES PATENTS

| | | | |
|---|---|---|---|
| 2,828,227 | 3/58 | Eisenberg | 117—130 |
| 3,039,891 | 6/62 | Mitchell. | |
| 3,098,803 | 7/63 | Godycki et al. | |
| 3,116,159 | 12/63 | Fisher et al. | 117—47 |

OTHER REFERENCES

Blois, Jr.: "Preparation of Thin Magnetic Films and Their Properties," Journal of Applied Physics, vol. 26, No. 8, pp. 975–980, August 1955.

Brenner et al.: "Deposition of Nickel and Cobalt by Chemical Reduction," Journal of Research of the National Bureau of Standards, Research Paper RP 1835, vol. 39, pp. 385–395, November 1947.

Wesley: "Nickel Immersion Coating," Plating, vol. 37, No. 7, pp. 732–734, 756, July 1950.

Bozorth: Ferromagnetism, D. Van Nostrand, New York, 1951, pp. 116 and 322.

Brenner: "Electroless Plating Comes of Age," Metal Finishing, vol. 52, No. 11, pp. 68–70, November 1954.

Symposium on Electroless Nickel Plating, ASTM Special Technical Publication No. 265, 1959.

WILLIAM D. MARTIN, *Primary Examiner.*

MURRAY KATZ, *Examiner.*